United States Patent [19]
Bullock et al.

[11] Patent Number: 5,448,484
[45] Date of Patent: Sep. 5, 1995

[54] NEURAL NETWORK-BASED VEHICLE DETECTION SYSTEM AND METHOD

[76] Inventors: Darcy M. Bullock, 3592 Beechwood Blvd., Pittsburgh, Pa. 15217; James H. Garrett, Jr., 307 S. Highlander Heights Dr., Glenshaw, Pa. 15116; Chris T. Hendrickson, 6933 Rosewood St., Pittsburgh, Pa. 15208

[21] Appl. No.: 970,800

[22] Filed: Nov. 3, 1992

[51] Int. Cl.⁶ .................................... G06F 15/70
[52] U.S. Cl. .................................. 364/436; 395/23; 340/933
[58] Field of Search ...................... 364/436; 395/23; 340/933, 934, 937

[56] References Cited

U.S. PATENT DOCUMENTS

| | | | |
|---|---|---|---|
| 4,847,772 | 7/1989 | Michalopoulos et al. | 364/436 |
| 4,941,122 | 7/1990 | Weideman | 364/807 |
| 4,951,239 | 8/1990 | Andes et al. | 364/807 |
| 5,050,095 | 9/1991 | Samad | 364/513 |
| 5,091,780 | 2/1992 | Pomerleau | 358/108 |
| 5,101,361 | 3/1992 | Eberhardt | 395/24 |
| 5,103,306 | 4/1992 | Weiman et al. | 358/133 |
| 5,113,483 | 5/1992 | Keeler et al. | 395/23 |
| 5,161,107 | 11/1992 | Maycaux et al. | 364/436 |
| 5,200,818 | 4/1993 | Neta et al. | 358/87 |
| 5,214,744 | 5/1993 | Schweizer et al. | 395/21 |
| 5,228,113 | 7/1993 | Shelton | 395/23 |
| 5,253,329 | 10/1993 | Villarreal et al. | 395/24 |
| 5,296,852 | 3/1994 | Rathi | 340/933 |

OTHER PUBLICATIONS

Dean A. Pomerleau, *ALVINN: An Autonomous Land Vehicle in a Neural Network*, Carnegie Mellon School of Computer Science Technical Report CMU-CS-8-9-107, Jan., 1989.

Scott E. Fahlman, *An Empirical Study of Learning Speed in Back-Propogation Networks*, Carnegie Mellon School of Computer Science Technical Report CMU-CS-8-8-162, Jun., 1988.

J. M. Blosseville et al., *TITAN: A Traffic Measurement System Using Image Processing Techniques*, Second International Conference on Road Traffic Monitoring, pp. 84–88 (IEE Feb., 1989).

A. D. Houghton et al., *Automatic Vehicle Recognition*, Second International Conference on Road Traffic Monitoring, pp. 71–78 (IEE Feb., 1989).

K. Shimizu et al., *Image Processing System Using Cameras for Vehicle Surveillance*, Second International Conference on Road Traffic Monitoring, pp. 61–65 (IEE Feb., 1989).

J. Versavel et al., *Camera and Computer Aided Traffic Sensor*, Second International Conference on Road Traffic Monitoring, pp. 66–70 (IEE Feb., 1989).

*Primary Examiner*—Thomas G. Black
*Assistant Examiner*—Susan Wieland
*Attorney, Agent, or Firm*—Kirkpatrick & Lockhart

[57] ABSTRACT

The present invention is directed to a neural network-based system for detecting the presence of a vehicle within a traffic scene. The vehicle detection system comprises an apparatus for producing an image signal representative of an image of the traffic scene and a trainable neural network for identifying the presence of a vehicle within the traffic scene. The present invention is also directed to a method for detecting the presence of a vehicle within a traffic scene. The vehicle detection method includes the steps of producing an image signal representative of an image of the traffic scene, collecting a training set of these image signals, training a neural network from this training set of image signals to correctly identify the presence of a vehicle within the traffic scene and performing surveillance of the traffic scene with the trained neural network to detect the presence of a vehicle.

11 Claims, 8 Drawing Sheets

NEURAL NETWORK-BASED VEHICLE DETECTION SYSTEM AND METHOD

BACKGROUND OF THE INVENTION

1. Field of the Invention

The present invention is directed generally to a system and method for detecting moving vehicles on roadways and, more specifically, to a neural network-based system and method for vehicle detection.

2. Description of the Background of the Invention

Vehicle detection on roadways is useful for a variety of traffic engineering applications from intersection signal control to transportation planning. Traditional detection methods have relied on mechanical or electrical devices placed on top of, or embedded in, roadway pavements. These systems are relatively expensive to install, tend to be unreliable over time and are limited in their abilities.

Considerable research has been conducted in the area of machine vision for *Wide Area Vehicle Detection Systems* (WADS). One noteworthy vision-based traffic sensor was developed in a cooperative effort between the Belgian government, Leuven University and Devlonics Control. This system is currently marketed as CCATS (Camera and Computer Aided Traffic Sensor) by Devlonics Control. Another WADS developed by the Metropolitan Expressway of Japan is used to measure traffic volume, average speed and space occupancy. The University of Sheffield in the United Kingdom has also conducted research on automatic vehicle recognition using a special purpose image processing machine (RAPAC) developed at the university. Researchers in France have developed a prototype image-based traffic measurement system called TITAN. This system is designed to measure volumes, speed and occupancy on multi-lane freeways under light traffic conditions. Under heavy traffic conditions, it is only capable of measuring occupancy. Additional information concerning these systems can be found in Darcy Bullock et al., *A Prototype Neural Network for Vehicle Detection,* Proceedings of the Artificial Neural Networks in Engineering (ANNIE '91) Conference (held Nov. 10—13, 1991) (ASME Press, New York, N.Y. 1991) which is hereby incorporated by reference.

However, these systems have typically employed conventional image processing and pattern matching algorithms which often require large amounts of computing resources. In addition, many installations have been sensitive to varying lighting conditions, camera perspectives and shadows.

Thus, the need exists for a system designed to detect passing vehicles on a roadway which is inexpensive to install, is reliable over time and has the capability to detect vehicles located in various positions on the roadway. Moreover, such a system must not require large amounts of computing resources and must be relatively insensitive to varying lighting conditions, camera perspectives and shadow conditions.

SUMMARY OF THE INVENTION

The present invention is directed to a system for detecting the presence of a vehicle within a traffic scene. The vehicle detection system comprises means for producing an image signal representative of an image of the traffic scene as well as means for processing the image signal to identify the presence of a vehicle within the traffic scene.

The present invention is also directed to a method for detecting the presence of a vehicle within a traffic scene. The vehicle detection method includes the steps of producing an image signal representative of an image of the traffic scene and collecting a training set of these image signals. The vehicle detection method further includes the steps of training a neural network from the training set of image signals to correctly identify the presence of a vehicle within the traffic scene and then performing surveillance of the traffic scene with the trained neural network to detect the presence of a vehicle within the traffic scene.

The system and method of the present invention provide the means for detecting passing vehicles on a roadway which is inexpensive to install, is reliable over time and has the capability to detect vehicles located in various positions on the roadway. Further, the system and method of the present invention do not require large amounts of computing resources and are relatively insensitive to varying lighting conditions, camera perspectives and shadow conditions. These and other advantages and benefits of the present invention will become apparent from the description of a preferred embodiment hereinbelow.

BRIEF DESCRIPTION OF THE DRAWINGS

For the present invention to be clearly understood and readily practiced, a preferred embodiment will now be described, by way of example only, with reference to the accompanying figures wherein.

DETAILED DESCRIPTION OF THE PREFERRED EMBODIMENT

Figure 1:
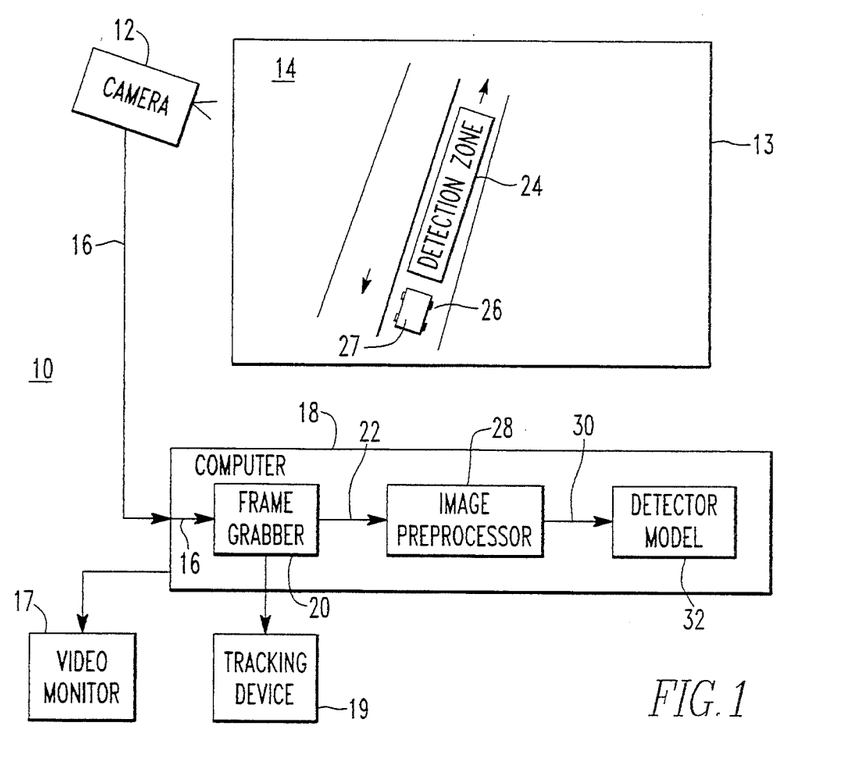
FIG. 1 illustrates a simplified representation of the architecture of the vehicle detection system of the present invention.

A simplified representation of the architecture of a vehicle detection system 10 of the present invention is illustrated in FIG. 1. Like reference numerals are employed among the various figures to designate like elements. A video surveillance camera 12 is utilized to observe an ordinary traffic scene 14. The video surveillance camera 12 produces an analog video signal 16 representing a video image 13 of the objects viewed by the video surveillance camera 12 in the traffic scene 14. One of ordinary skill in the art will recognize that an infrared camera (not shown) or a laser range finder (not shown) may be utilized in place of the video surveillance camera 12 to produce an image signal (not shown) equivalent to the analog video signal 16. The analog video signal 16 is transmitted to a computer 18. The computer 18 may be of the personal computer class incorporating an 80386 microprocessor (not shown) and at least 1 MB of random access memory (not shown). One of ordinary skill in the art will also recognize that other computing platforms including nubus, STD bus, VME bus and single board computers may be utilized in conjunction with the vehicle detection system 10 of the present invention.

An image preprocessor 28 and a detector model 32 are described below according to the functions that they perform and as being located in the computer 18. However, one of ordinary skill in the art will readily recognize the manner in which the image preprocessor 28 and the detector model 32 can be implemented either in computer software operating on the computer 18 or in computer hardware. Neural network simulator software and neural network integrated circuit chips are commercially available for these implementations.

Figure 2:
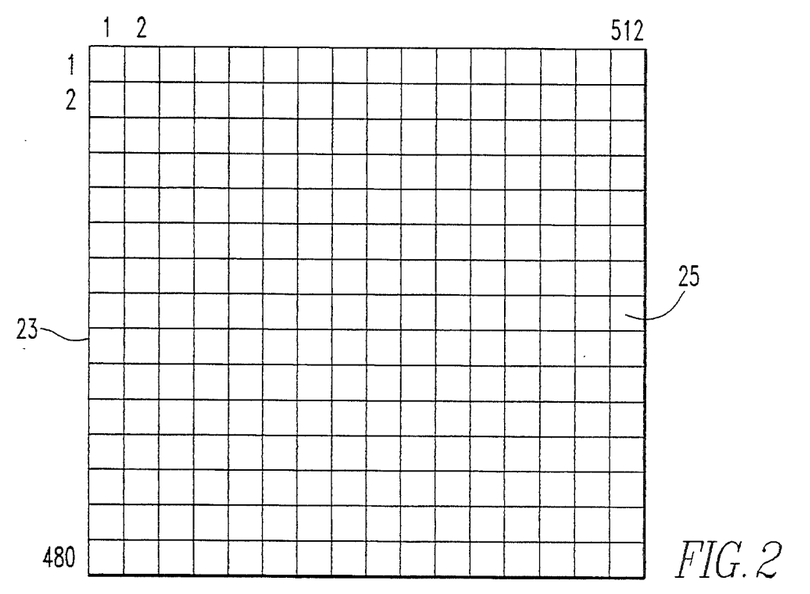
FIG. 2 illustrates a pixel map produced by the frame grabber depicted in FIG. 1.

A frame grabber 20 in the computer 18 converts the analog video signal 16 (or an image signal (not shown) from an infrared camera (not shown) or a laser range finder (not shown)) to a digitized image signal 22 representing one frame of the video image 13 suitable for computer-based manipulation. One of ordinary skill in the art will recognize that the frame grabber 20 can be implemented utilizing any commercially available computer board designed to digitize analog video signals. The digitized image signal 22 is composed of a finite number of pixels 25 (FIG. 2) with each assigned numerical values between zero (0) and two hundred fifty-five (255) in proportion to their gray scale intensities. The extreme values, zero (0) and two hundred fifty-five (255), correspond to black and white, respectively. Thus, the digitized image signal 22 represents a pixel map 23 (FIG. 2) of one frame of the video image 13 viewed by the video surveillance camera 12. A frame grabber 20 producing a 512×480 pixel map 23 (FIG. 2) may be used in connection with the vehicle detection system 10 of the present invention. However, one of ordinary skill in the art will recognize that any sized pixel map 23 (FIG. 2) may be used and that, although a gray scale frame grabber 20, which produces a single pixel map 23 (FIG. 2), is described in connection with the preferred embodiment of the present invention, a color frame grabber 20, which produces three pixel maps 23 (one for each primary color) (FIG. 2), may also be used. The three primary color pixel maps 23 produced by the color frame grabber 20 may be maintained as separate pixel maps 23 or may be utilized to compute a single pixel map 23 based upon a weighted average of the three primary color pixel maps 23.

A detection zone 24 in and/or around a traffic lane 26 through which vehicles 27 will pass is specified within the video image 13 by an operator as explained more fully below. While only one detection zone 24 in video image 13 is discussed for purposes of describing the vehicle detection system 10 of the present invention, multiple detection zones 24 in multiple traffic lanes 26 may be desirable in an actual production system. This could be accommodated by multiplexing several detection zones 24 into the detector model 32 discussed below. A detection zone pixel map 34 (FIG. 3) corresponding to the detection zone 24 is extracted from the digitized image signal 22 by the image preprocessor 28 in computer 18 and transmitted in the form of a digitized detection zone signal 30 to the detector model 32, also in computer 18.

The resolution of the detection zone pixel map 34 (FIG. 3) is much finer than is required for the purpose of vehicle detection. As a result, a coarser-grained tiled detection zone pixel map 35 (FIG. 3) is constructed from the detection zone pixel map 34 (FIG. 3) by an image processor 31 of detector model 32 shown in more detail in FIG. 3. Each tile 36 in the tiled detection zone pixel map 35 is represented by one numerical value between zero (0) and two hundred fifty-five (255) corresponding to the average gray scale intensity of a corresponding a×b area in the detection zone pixel map 34. For example, the value corresponding to Tile 1 is computed by calculating the average of the a×b tile in the lower right corner of detection zone pixel map 34 where a and b indicate the dimensions (in pixels) of the area corresponding to a single tile 36. Similarly, the value corresponding to Tile n is computed by calculating the average of the a×b area in the upper left corner of detection zone pixel map 34. Taking elementary statistical sampling theory into account, as is well known to those of ordinary skill in the art, the average gray scale value for a tile 36 can be computed with sufficient accuracy by sampling only 4% of the pixels 25 in the a×b region of detection zone pixel map 34. Since the tiled detection zone pixel map 35 requires only one value between zero (0) and two hundred fifty-five (255) to represent an area of the detection zone 24 that previously required a*b values, the tiled detection zone pixel map 35 depicts the detection zone 24 more efficiently than the detection zone pixel map 34. The tiled detection zone pixel map 35 may optionally be enhanced through normalization so that 5% of the tiles 36 are black (numerical value=zero (0)), 5% of the tiles 36 are white (numerical value=two hundred fifty-five (255)) and the numerical values of the remaining tiles 36 are uniformly distributed between one (1) and two hundred fifty-four (254).

Figure 3:
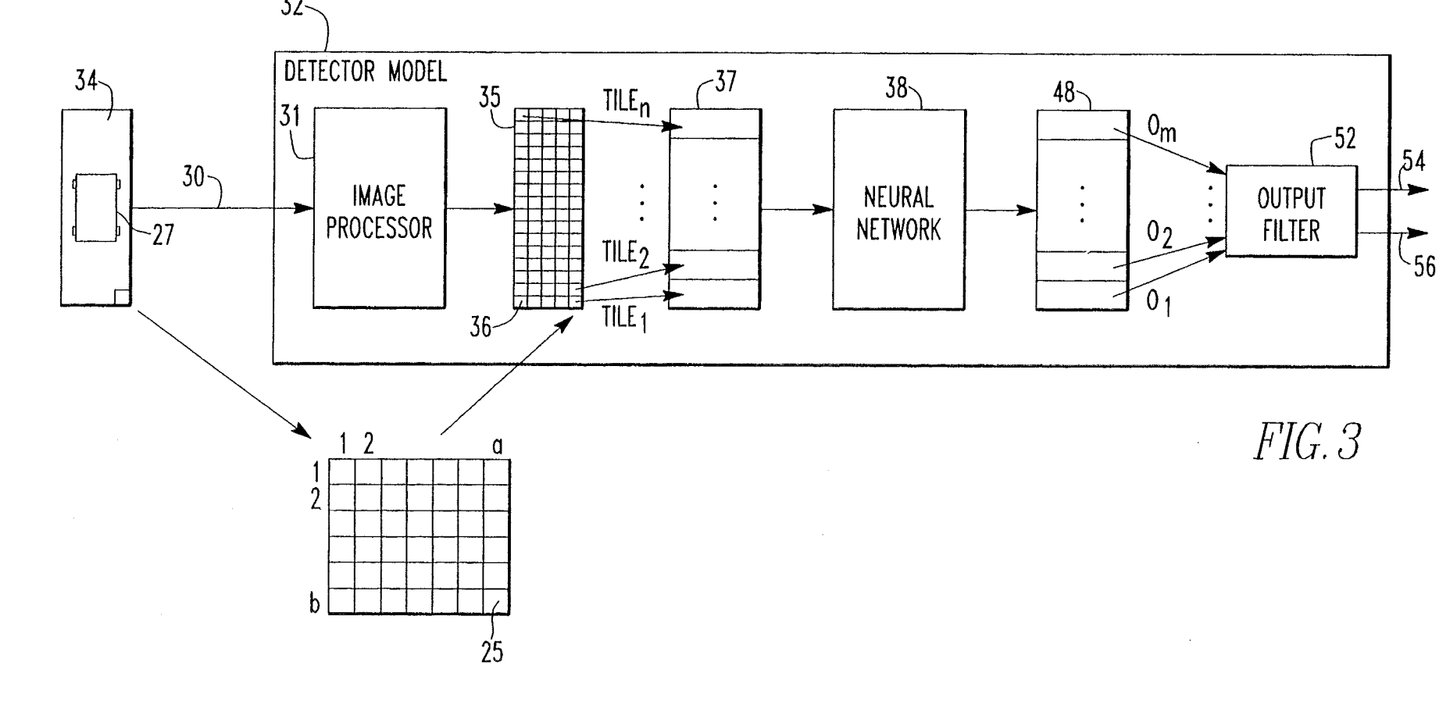
FIG. 3 depicts the various components of the detector model illustrated in FIG. 1.

The tiled detection zone pixel map 35 is mapped into a tiled detection zone pixel vector 37 of length n (where n is the total number of tiles 36 in the tiled detection zone pixel map 35) which is then input to a neural network 38. As is well known to those of ordinary skill in the art, the neural network 38 is a computational model that consists of a highly interconnected network of simple processing units. Each processing unit can receive inputs, transmit outputs and perform calculations. Those of ordinary skill in the art will further recognize that the neural network 38 can be trained to locate a vehicle 27 (FIG. 1) by inputting to the neural network 38 example tiled detection zone pixel vectors 37 representing images of vehicles 27 (FIG. 1) at various locations within the detection zone 24 (FIG. 1) under various lighting conditions. This ability to train the neural network 38 provides a significant benefit in comparison to classical image processing techniques since the neural network 38 can adapt to an infinite range of video surveillance camera 12 perspectives, lighting conditions, etc., if provided with examples of these variations.

Figure 4:
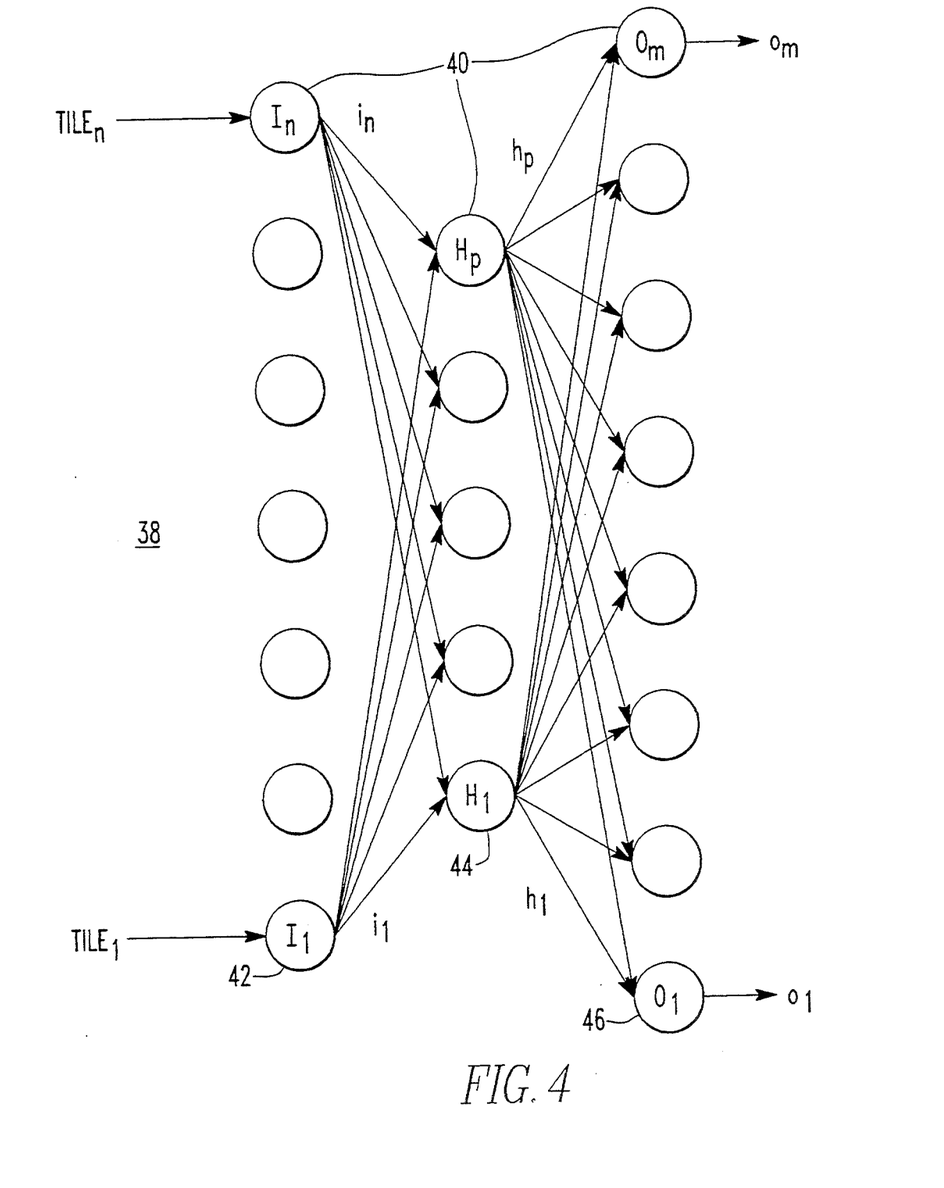
FIG. 4 depicts the various components of the neural network illustrated in FIG. 3.

A neural network 38 architecture that may be employed in conjunction with the vehicle detection system 10 of the present invention is based on a particular class of neural networks referred to as feedforward/backpropogation neural networks. A feedforward/backpropogation neural network is constructed by assembling a directed graph of simple processing elements 40 (FIG. 4). Three layers of processing elements 40 are shown in the neural network 38 illustrated in more detail in FIG. 4. Neural network 38 is composed of n input processing units 42, p hidden processing units 44, and m output processing units 46. The number of input processing units 42 is equal to the number of entries in the tiled detection zone pixel vector 37 (FIG. 3). The number of hidden processing units 44 may be six (6) as was determined in one experiment to produce the most efficient neural network 38 performance. It has also been determined experimentally that nine (9) output processing units 46 adequately represent the location of the vehicle 27 (FIG. 1) within the detection zone 24 (FIG. 1). Additional detail concerning the results of experiments performed to determine the optimal number of hidden processing units 44 and output processing units 46 may be found in Darcy Bullock et al., *A Video Image Based Neural Network for Vehicle Detection*, Proceedings of the International Conference on Artificial Intelligence—Applications in Transportation Engineering (held Jun. 20-24, 1992) (Engineering Foundation, New York, N.Y. 1992) which is hereby incorporated by reference. One of ordinary skill in the art will recognize, however, that many different configurations of the neural network 38 incorporating various numbers of input processing units 42, hidden processing units 44, hidden processing unit 44 layers and output processing units 46 may be used in the vehicle detection system 10 of the present invention.

Each input processing unit 42 $I_j$ receives an input signal $Tile_j$ corresponding to the value of one entry in the tiled detection zone pixel vector 37 (FIG. 3) and produces a normalized output signal $i_j$ as set forth in the following equation:

$$i_j = (Tile_j - 128)/128.0, \forall j=1,\ldots,n$$

where $i_j$ is in the range $[-1..1]$.

Each output signal $i_j$ from each input processing unit 42 $I_j$ is input to each of the hidden processing units 44 $H_k$. Each hidden processing unit 44 $H_k$ produces a normalized output signal $h_k$ as determined by the following equation:

$$h_k = f(\Sigma j^n = 1 w_{j,k} i_j + \beta_k), \forall k=1,\ldots,p$$

where each $w_{j,k}$ is a gain assigned to the signal $i_j$ from input processing unit 42 $I_j$ to hidden processing unit 44 $H_k$, $\beta_k$ is a bias assigned to hidden processing unit 44 $H_k$ and f(x) is the hyperbolic tangent function:

$$f(x) = \frac{\exp(x) - \exp(-x)}{\exp(x) + \exp(-x)}$$

Other normalizing filter functions could be used for this transformation, such as the sigmoid function:

$$f(x) = 1/(1+e^{-x})$$

However, the hyperbolic tangent function has been found to be effective in similar image processing applications since the output is symmetric about the origin.

In a similar fashion, each output signal $h_k$ from each hidden processing unit 44 $H_k$ is input to each of the output processing units 46 $O_l$. Each output processing unit 46 $O_l$ produces a normalized output signal $O_l$ as determined by the following equation:

$$O_l = f(\Sigma k^p = 1 w_{k,l} h_k + \beta_l), \forall l=1,\ldots,m$$

where each $w_{k,l}$ is a gain assigned to the signal $h_k$ from hidden processing unit 44 $H_k$ to output processing unit 46 $O_l$, $\beta_l$ is a bias assigned to output processing unit 46 $O_l$ and f(x) is the hyperbolic tangent function set forth above.

Figure 5:
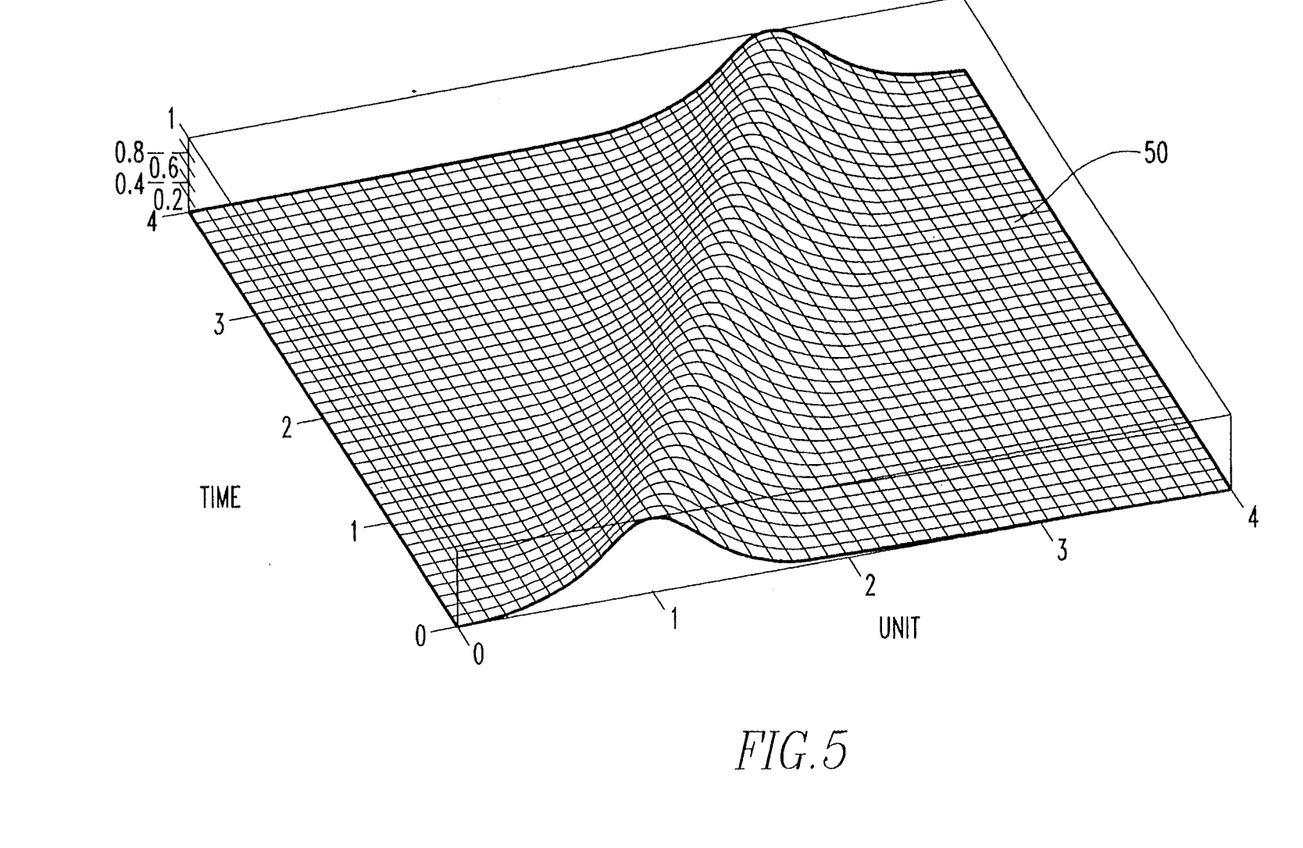
FIG. 5 illustrates an idealized Gaussian-shaped surface produced by the neural network shown in FIGS. 3 and 4.

The output signal $O_l$ from each output processing unit 46 $O_l$ is mapped sequentially into an ordered output vector 48 of length m (where m is the total number of output processing units 46) shown in FIG. 3. The values in the ordered output vector 48 represent a rough approximation to a discretized Gaussian-shaped curve (plus noise). Each output signal $O_l$ in the ordered output vector 48 corresponds to a portion of the detection zone 24 (FIG. 1) such that the peak of the Gaussian-shaped curve occurs at a point on the curve corresponding to the output signal $O_l$ with the largest amplitude which in turn corresponds to the location of a vehicle 27 (FIG. 1) within the detection zone 24 (FIG. 1). Thus, an idealized Gaussian-shaped surface 50 (FIG. 5), produced by the neural network 38 (FIGS. 3, 4), represents a sequential set of ordered output vectors 48 for the time period during which a vehicle 27 (FIG. 1) passes through the detection zone 24 (FIG. 1).

The output vector 48 is then input to output filter 52. The output filter 52 produces two signals, a presence output signal 54 and a pulse output signal 56. The presence output signal 54 indicates that a vehicle 27 (FIG. 1) is somewhere within the detection zone 24 (FIG. 1). The pulse output signal 56 indicates that a vehicle 27 (FIG. 1) has passed through the detection zone 24 (FIG. 1). The presence output signal 54 is set to a logical "1" whenever at least one of the output signals $O_l$ in output vector 48 exceeds a threshold value. This threshold value is typically in the range from 0.6 to 0.8. To produce the pulse output signal 56, the output filter 52 must observe a time series of output vectors 48 and perform a matched filter operation, as is well known to those of ordinary skill in the art, to detect when a vehicle 27 (FIG. 1) passes through the detection zone 24 (FIG. 1).

Figure 6:
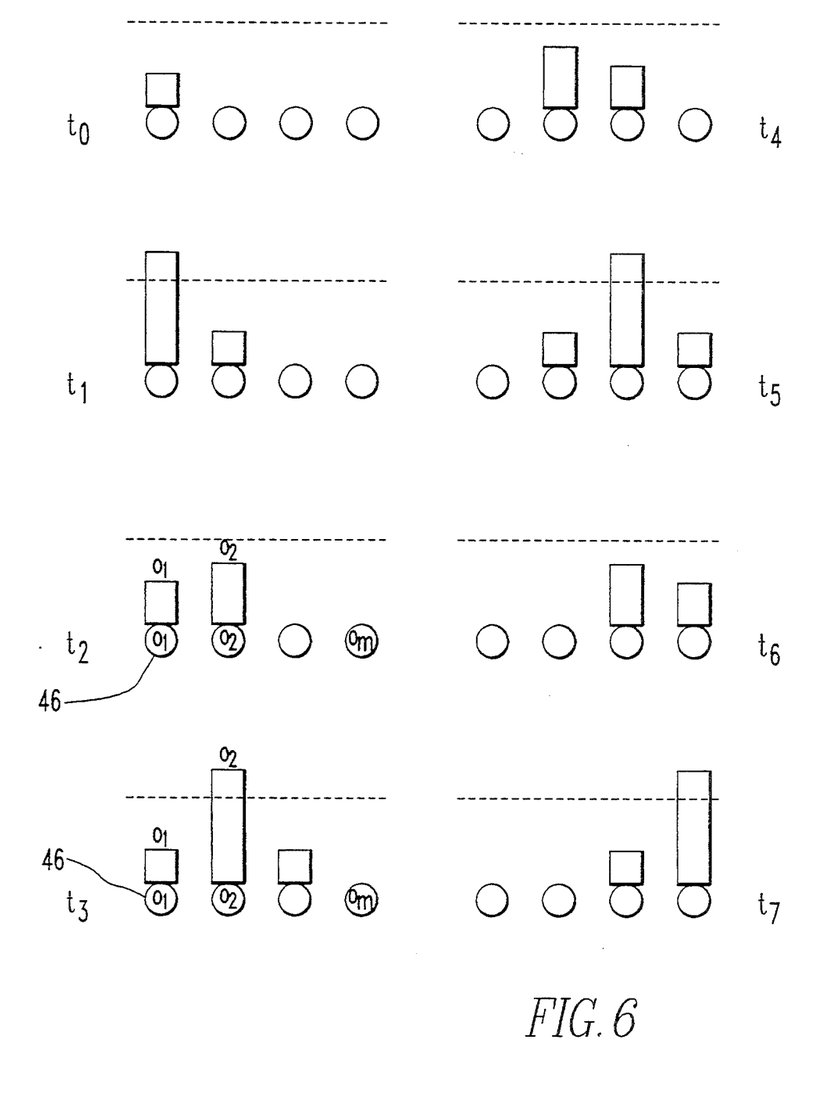
FIG. 6 depicts a neural network output vector time series for a vehicle moving through a detection zone of the vehicle detection system of the present invention.

The matched filter operation performed by the output filter 52 must recognize an infinite family of Gaussian-shaped curves (acceleration of the observed vehicle=0) and skewed Gaussian-shaped curves (acceleration of the observed vehicle≠0). To avoid the overhead associated with traditional signal processing methods, a heuristic method is used by the output filter 52 to process the time series of output vectors 48 and cause a pulse to be generated on the pulse output signal 56 after a particular pattern has been recognized. The distinctive pattern searched for is the sequential movement within the output vector 48 of a signal $O_l$ exceeding a threshold value (typically in the range from 0.6 to 0.8) over the time series of output vectors 48. This sequential movement is associated with the movement of a vehicle 27 (FIG. 1) through the detection zone 24 (FIG. 1). In other words, the first output vector 48 has no output signals $O_l$ that exceed the threshold value, the second output vector 48 has an output signal $O_l$ that exceeds the threshold value at location 1, the third output vector 48 has no output signals $O_l$ that exceed the threshold value, the fourth output vector 48 has an output signal $O_l$ that exceeds the threshold value at location 2 and so forth. An example of this progression is shown in FIG. 6. When the output filter 52 (FIG. 3) observes the sequential propagation of a signal $O_l$ exceeding the threshold value from the first output processing unit $O_1$ to the last output processing unit $O_m$, the output filter 52 produces a pulse on the pulse output signal 56 to signify the passage of a vehicle 27 (FIG. 1). The pulse output signal 56 may be utilized to increment a counter (not shown) signifying the number of vehicles 27 (FIG. 1) that have passed through the detection zone 24 (FIG. 1).

Figure 7:
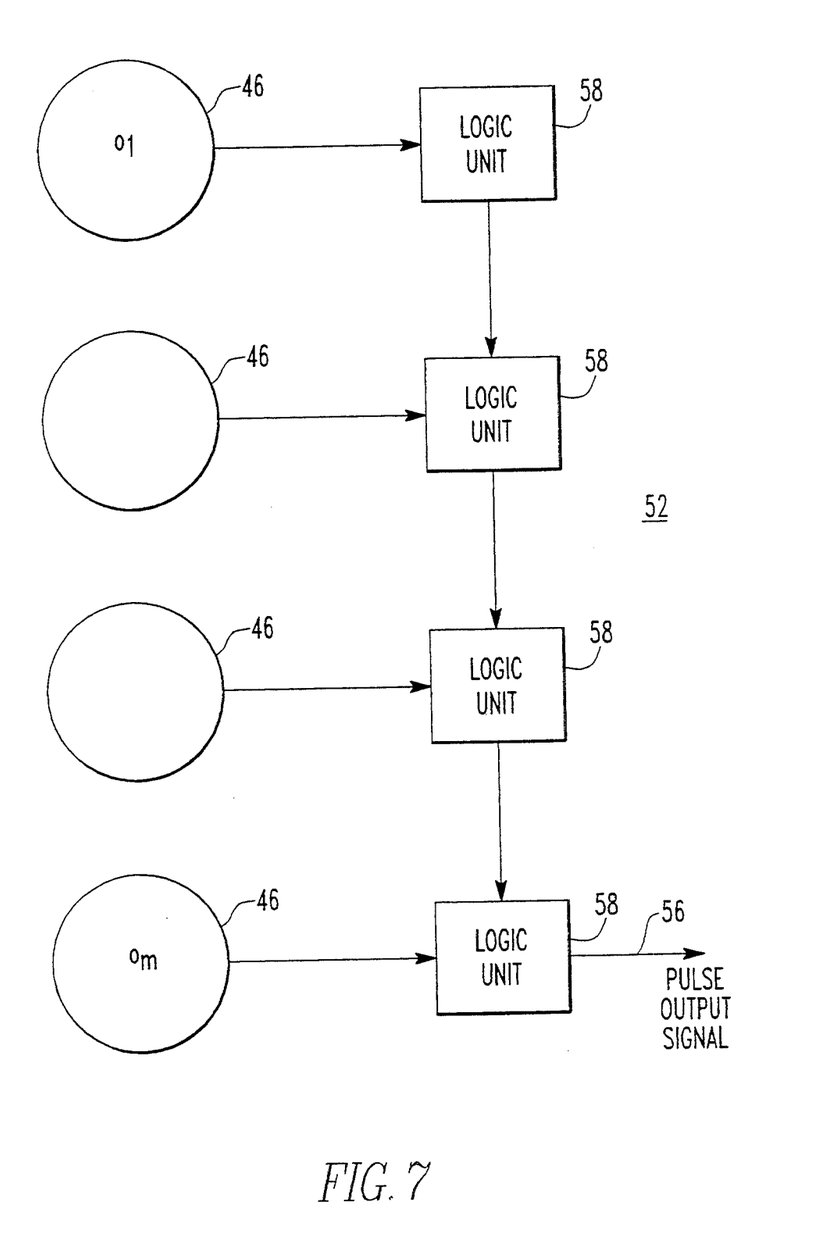
FIG. 7 illustrates a message passing model of the output filter depicted in FIG. 3.

The output filter 52 can be described simply as a message passing system of the form shown in FIG. 7 consisting of output processing units 46, logic units 58 and pulse output signal 56. So long as a signal $O_l$ exceeding the threshold value is sequentially produced at output processing units 46 from top to bottom (as illustrated in FIG. 7), the output filter 52 will consider the resulting sequence of output vectors 48 (FIG. 3) as signifying that a vehicle 27 (FIG. 1) has passed through the detection zone 24 (FIG. 1). A pulse is generated on the pulse output signal 56 when the signal $O_l$ exceeding the threshold value is produced by the bottom output processing unit 46 $O_m$. One of ordinary skill in the art will recognize that timeout logic must also be incorporated to recover from the situation where a vehicle 27 (FIG. 1) makes a sudden change between traffic lanes 26 (FIG. 1) out of the detection zone 24 (FIG. 1).

For the vehicle detection system 10 of the present invention to be useful, a proper set of connection weights ($w_{j,k}$, $w_{k,l}$) and biases ($\beta_k$, $\beta_l$) for use with the neural network 38 (FIG. 3) must be obtained. These weights and biases will provide the desired mapping between a vehicle location described by the tiled detection zone pixel vector 37 (Tile$_1$,...,Tile$_n$) and the Gaussian-shaped output described by the output vector 48 ($O_1$,...,$O_m$). The development of these connection weights and biases is accomplished through a procedure call "network training". A closed-loop, gradient descent weight modification procedure known as the *Generalized Delta Rule* may be used as a learning rule for the network training. The *Generalized Delta Rule* is more fully described in *Parallel Distributed Processing Explorations in the Microstructure of Cognition* Volume 1: Foundations, David E. Rumelhart et al. eds., (The MIT Press, Cambridge, Mass. 1989) which is hereby incorporated by reference. Those of ordinary skill in the art will recognize that other learning rules, such as QUICKPROP TM, may also be used in the network training procedure. The QUICKPROP TM learning rule is more fully described in Scott E. Fahlman, *An Empirical Study of Learning Speed in Back-Propagation Networks*, (Carnegie Mellon University School of Computer Science Technical Report CMU-CS-88-162, Pittsburgh, Pa. 1988) which is hereby incorporated by reference.

Figure 8:
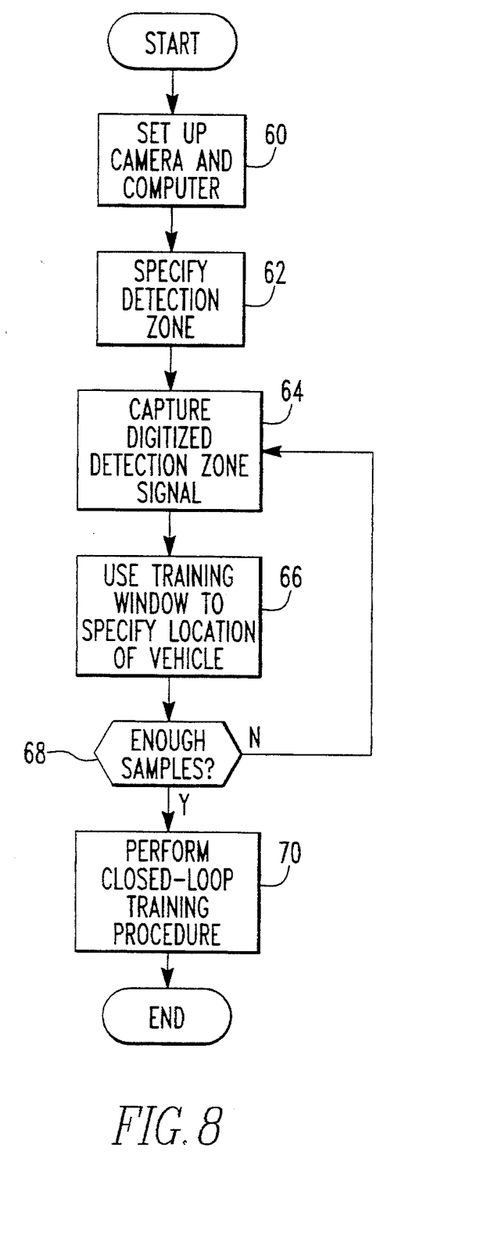
FIG. 8 illustrates a flow chart representing the steps employed in the network training procedure used in conjunction with the vehicle detection system of the present invention.

A network training method employed in conjunction with the vehicle detection system 10 of the present invention is illustrated in the flow chart of FIG. 8. The first step of the training method is shown in step 60 where the video surveillance camera 12 and computer 18 of the vehicle detection system 10 illustrated in FIG. 1 are set-up to observe the traffic scene 14. The method continues with step 62 where the operator utilizes a tracking device 19, such as a mouse, and a video monitor 17 connected to the computer 18 to specify the detection zone 24 within a single traffic lane 26 of the video image 13 displayed on the video monitor 17. In step 64 of the flow chart, the operator, through the tracking device 19, signals the computer 18 to capture the digitized detection zone signal 30 for the detection zone 24 specified in step 62 (FIG. 8).

Figure 9:
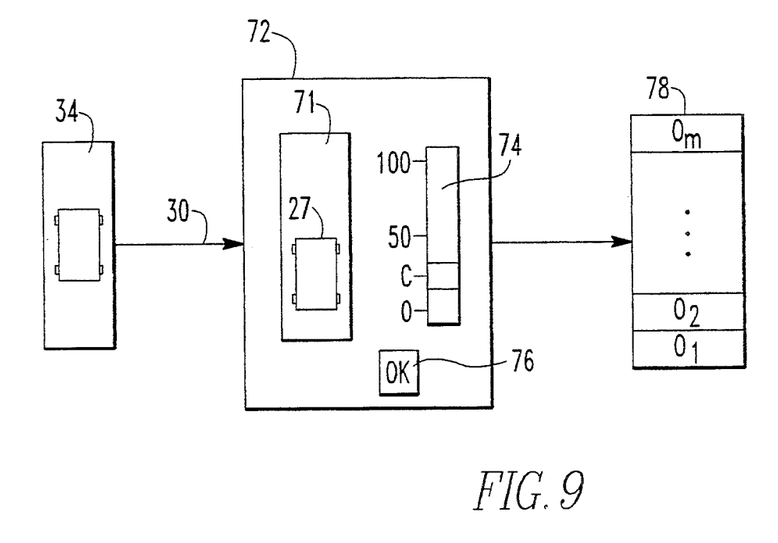
FIG. 9 illustrates a training window for use in connection with the network training procedure employed in the vehicle detection system of the present invention.

The method continues with step 66 of the flow chart where a detection zone image 71 (FIG. 9) represented by the digitized detection zone signal 30 captured in step 64 is displayed on the video monitor 17 (FIG. 1) in conjunction with a training window 72 (FIG. 9) so that an operator is able to manually specify the location of a vehicle 27 (FIG. 9) within the detection zone 24 (FIG. 1). The training window 72 (FIG. 9) displays the detection zone image 71 (FIG. 9) as well as a slider bar 74 that can be positioned by the tracking device 19 (FIG. 1) and an "OK" button 76 (FIG. 9) that the operator clicks on with the tracking device 19 when the slider bar 74 is appropriately positioned near the center of the image of the vehicle 27 (FIG. 9) within the detection zone image 71. The position of the slider bar 74 is converted to an expected output vector 78, of length m (where m is the number of output processing units 46), describing a Gaussian-shaped curve centered at C using the following equation:

$$O_i = \left\{ \exp\left( \frac{-((100/m)i - C)^2}{100} \right); i = 1, \ldots, m \right\}$$

The expected output vector 78 may also be normalized so that its constituent values are in the range $[-1..1]$ and is stored along with the corresponding digitized detection zone signal 30 in the random access memory (not shown) of the computer 18 (FIG. 1).

In step 68 of the flow chart of FIG. 8, a determination is made whether a representative number of digitized detection zone signals 30 and corresponding expected output vectors 78 have been obtained. A representative number of samples may be approximately 100. If an adequate number of samples have been obtained, the method continues with step 70. Otherwise, the method is repeated beginning with step 64.

In step 70, a closed-loop training procedure (e.g., the *Generalized Delta Rule*) is performed using each detection zone signal 30 and corresponding expected output vector 78 pair stored in step 66. The training process is performed by first using the neural network 38 (FIGS. 3, 4) to compute an output vector 48 (FIG. 3) (using a randomly generated initial set of weights and biases) given as input a tiled detection zone pixel vector 37 (FIG. 3) constructed from one of the digitized detection zone signals 30 stored in step 66. An error is computed by comparing the output vector 48 to the expected output vector 78 obtained in step 66. The computed error is then backpropagated through the neural network 38, where the backpropagated error is used to modify the connection weights and biases according to the procedure defined by the *Generalized Delta Rule*. The procedure set forth in step 70 is repeatedly performed for each digitized detection zone signal 30 and expected output vector 78 pair (randomly ordered) until the computed error is within an acceptable tolerance. The result is that the neural network 38 (FIGS. 3, 4) is now "trained" and is capable of correctly producing the presence output signal 54 (FIG. 3) and the pulse output signal 56 (FIG. 3) given any tiled detection zone pixel vector 37 regardless of lighting conditions, vehicle 27 (FIG. 1) shape and vehicle 27 location within the detection zone 24 (FIG. 1).

Figure 10:
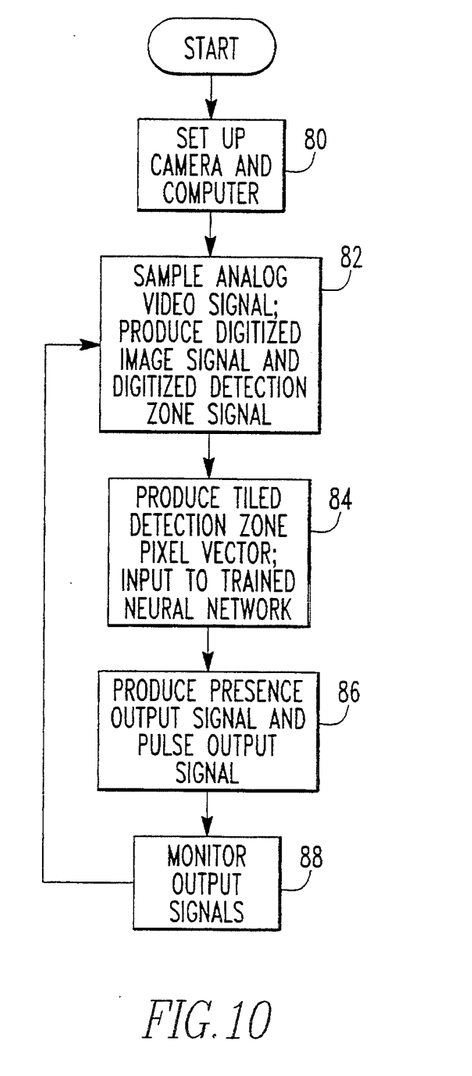
FIG. 10 illustrates a flow chart representing the open-loop operation of the vehicle detection system of the present invention.

Once the network training procedure has been completed and the proper connection weights ($w_{j,k}$, $w_{k,l}$) and biases ($\beta_k$, $\beta_l$) have been obtained, the vehicle detection system 10 may be operated for actual vehicle 27 (FIG. 1) detection according to the method illustrated in the flow chart of FIG. 10. In step 80, the video surveillance camera 12 (FIG. 1) and computer 18 (FIG. 1) are set up to observe the traffic scene 14 (FIG. 1). In step 82, the analog video signal 16 (FIG. 1) from video surveillance camera 12 is sampled by the frame grabber 20 (FIG. 1). As described above, a digitized image signal 22 (FIG. 1) as well as a digitized detection zone signal 30 (FIG. 1) are produced. The method continues with step 84 where tiled detection zone pixel vector 37 (FIG. 3) is produced and input to the trained neural network 38 (FIG. 3). The trained neural network 38 produces the presence output signal 54 (FIG. 3) and the pulse output signal 56 (FIG. 3) in step 86.

In step 88, presence output signal 54 (FIG. 3) may be monitored to determine whether a vehicle 27 (FIG. 1) is within detection zone 24 (FIG. 1). Pulse output signal 56 (FIG. 3) may increment a counter (not shown) if a vehicle 27 passing through the detection zone 24 has been identified. Steps 82, 84, 86 and 88 are sequentially executed at a cyclical processing rate such as 11 Hz. A processing rate of 11 Hz may be used in conjunction with the vehicle detection system 10 of the present invention in anticipation of vehicle 27 (FIG. 1) speeds of 75 miles per hour. A faster processing rate would be required for faster anticipated vehicle 27 speeds while a slower processing rate would be acceptable for slower vehicle 27 speeds.

While the present invention has been described in connection with an exemplary embodiment thereof, it will be understood that many modifications and variations will be readily apparent to those of ordinary skill in the art. This disclosure and the following claims are intended to cover all such modifications and variations.

We claim:

1. A system for detecting the presence of a vehicle within a traffic scene, said vehicle detection system comprising:
    means for producing an image signal representative of an image of the traffic scene that includes a video camera for producing an analog video signal representative of a video image of the traffic scene; and
    means for processing said image signal to identify the presence of the vehicle within the traffic scene wherein said means for processing includes:
    means for producing a digitized image signal from said analog video signal;
    means for specifying a detection zone within said video image and means for extracting a portion of said digitized image signal corresponding to said detection zone to produce a digitized detection zone signal;
    means for producing a tiled detection zone pixel map from said digitized detection zone signal;
    a trainable neural network comprising input processing units, hidden processing units and output processing units wherein an output from each of said input processing units is connected to an input of each of said hidden processing units and an output from each of said hidden processing units is connected to an input of each of said output processing units and wherein said trainable neural network produces an output signal at each of said output processing units representative of the presence of the vehicle within a portion of said detection zone and wherein an ordered vector of said output signals produces a Gaussian-shaped curve;
    means for inputting said tiled detection zone pixel map into said trainable neural network; and
    an output filter for producing a presence output signal indicating that the vehicle is within said detection zone, said output filter including means for producing a pulse output signal indicating that the vehicle has passed through said detection zone by performing a matched filter operation on a time series of said ordered vectors of said output signals to detect when the vehicle has passed through said detection zone.

2. The vehicle detection system of claim 1 wherein said trainable neural network is comprised of a single layer of input processing units, more than one layer of hidden processing units and a single layer of output processing units and wherein an output from each of said input processing units is connected to an input of each of said hidden processing units in a first layer of said hidden processing units, an output from each of said hidden processing units in a last layer of said hidden processing units is connected to an input of each of said output processing units, and multiple layers of said hidden processing units are interconnected such that said output from each of said hidden processing units in any one but said last of said layers of said hidden processing units is connected to said input of each of said hidden processing units in a next layer of said hidden processing units.

3. The vehicle detection system of claim 1 wherein said output filter includes means for producing a presence output signal when one of said output signals exceeds a threshold value.

4. The vehicle detection system of claim 3 wherein said threshold value is in the range from 0.6 to 0.8.

5. The vehicle detection system of claim 1 wherein said trainable neural network is implemented in computer software as a neural network simulator running on a computer.

6. The vehicle detection system of claim 1 wherein said trainable neural network is implemented in computer hardware.

7. The vehicle detection system of claim 1 wherein a numerical connection weight is assigned to (i) each of said connections between each of said outputs of each of said input processing units and each of said inputs of each of said hidden processing units and (ii) each of said connections between each of said outputs of each of said hidden processing units and each of said inputs of each of said output processing units.

8. The vehicle detection system of claim 7 wherein a numerical bias is assigned to each of said hidden processing units and each of said output processing units.

9. The vehicle detection system of claim 8 wherein the value of each of said numerical connection weights and each of said numerical biases is determined through a closed-loop training procedure utilizing backpropagation techniques.

10. The vehicle detection system of claim 9 wherein said closed-loop training procedure is the *Generalized Delta Rule*.

11. A method for detecting the presence of a vehicle within a traffic scene, comprising the steps of:

producing an image signal representative of an image of the traffic scene and an analog video signal representative of a video image of the traffic scene;

processing said image signal to identify the presence of the vehicle within the traffic scene;

producing a digitized image signal from said analog video signal;

specifying a detection zone within said video image and extracting a portion of said digitized image signal corresponding to said detection zone to produce a digitized detection zone signal;

producing a tiled detection zone pixel map from said digitized detection zone signal;

inputting said tiled detection zone pixel map into a trainable neural network comprising input processing units, hidden processing units and output processing units wherein an output from each of said input processing units is connected to an input of each of said hidden processing units and an output from each of said hidden processing units is connected to an input of each of said output processing units and wherein said trainable neural network produces an output signal at each of said output processing units representative of the presence of the vehicle within a portion of said detection zone and wherein an ordered vector of said output signals produces a Gaussian-shaped curve;

producing a presence output signal indicating that the vehicle is within said detection zone; and producing a pulse output signal indicating that the vehicle has passed through said detection zone by performing a matched filter operation on a time series of said ordered vectors of said output signals to detect when the vehicle has passed through said detection zone.

* * * * *